United States Patent

[11] 3,590,672

| [72] | Inventor | James Cordier<br>Erin, N.Y. |
|---|---|---|
| [21] | Appl. No. | 759,065 |
| [22] | Filed | Sept. 11, 1968 |
| [45] | Patented | July 6, 1971 |
| [73] | Assignee | Hardinge Brothers, Inc.<br>Elmira, N.Y. |

[54] RADIUS-TURNING ATTACHMENT FOR LATHES
7 Claims, 9 Drawing Figs.

| [52] | U.S. Cl. | 82/12 |
|---|---|---|
| [51] | Int. Cl. | B23b 5/40 |
| [50] | Field of Search | 82/12, 24 |

[56] References Cited
UNITED STATES PATENTS

| 599,275 | 2/1898 | Webb | 82/24 X |
|---|---|---|---|
| 2,701,429 | 2/1955 | Hartridge | 82/12 X |
| 2,716,913 | 9/1955 | Leerkamp | 82/12 |
| 2,741,241 | 4/1956 | Teather et al. | 82/12 X |
| 3,221,577 | 12/1965 | Baum | 82/12 |
| 3,379,076 | 4/1968 | Rachor | 82/12 X |

FOREIGN PATENTS

| 639,552 | 6/1950 | Great Britain | 82/12 |
|---|---|---|---|

Primary Examiner—Leonidas Vlachos
Attorney—Shlesinger, Arkwright & Garvey

ABSTRACT: This disclosure is of an attachment for lathes by means of which highly accurate work can be done so that the attachment may be used, for example, by forming contact lenses and in which two slides are provided, a cross-slide for setting the cutting tool on the center of the lathe spindle, and another slide on which a swivel tool-carrying member, which arrangement allows the tool to be fed in without changing radius for which the tool-carrying member is set. This disclosure also provides readily adjustable means for setting the radius of the cut.

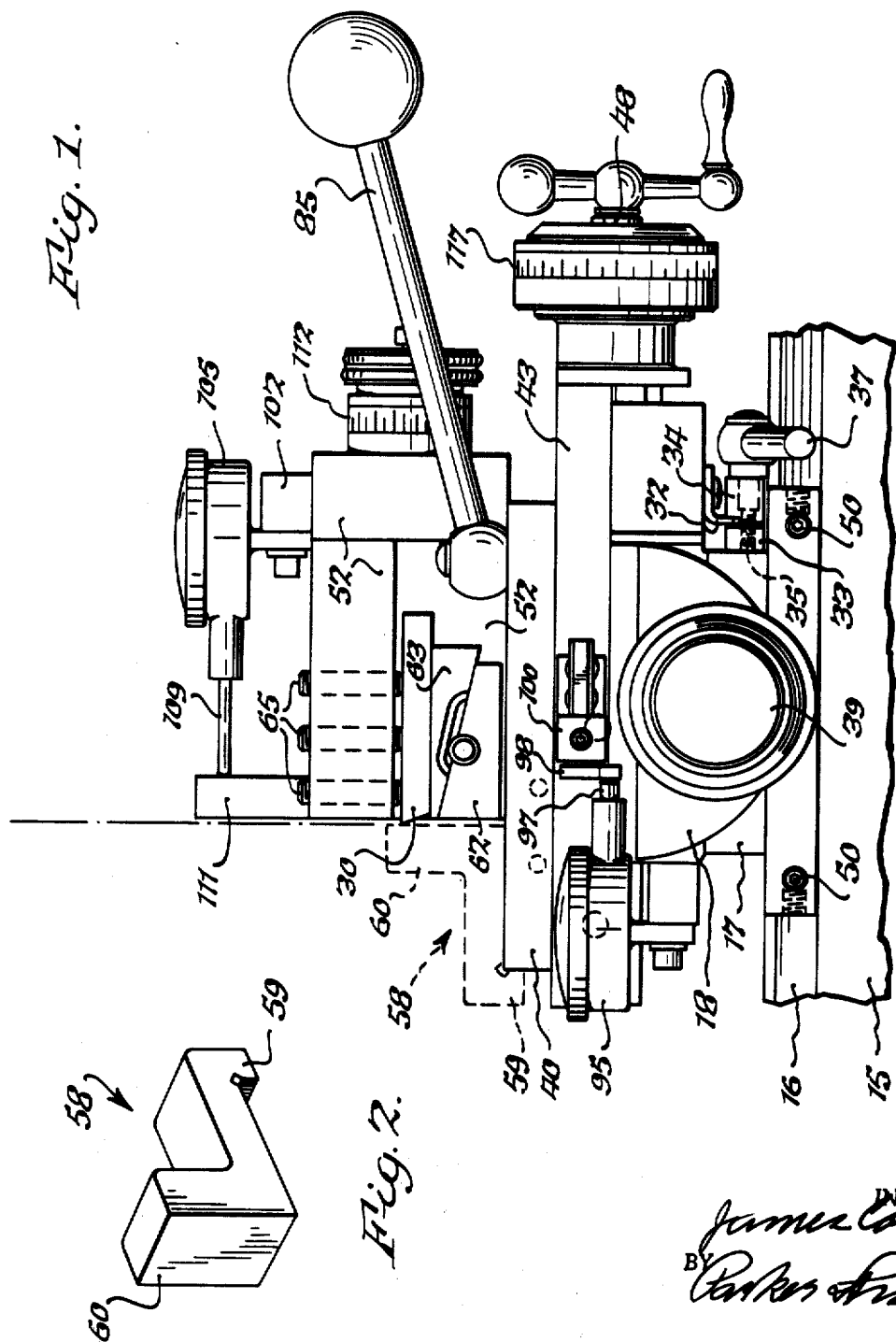

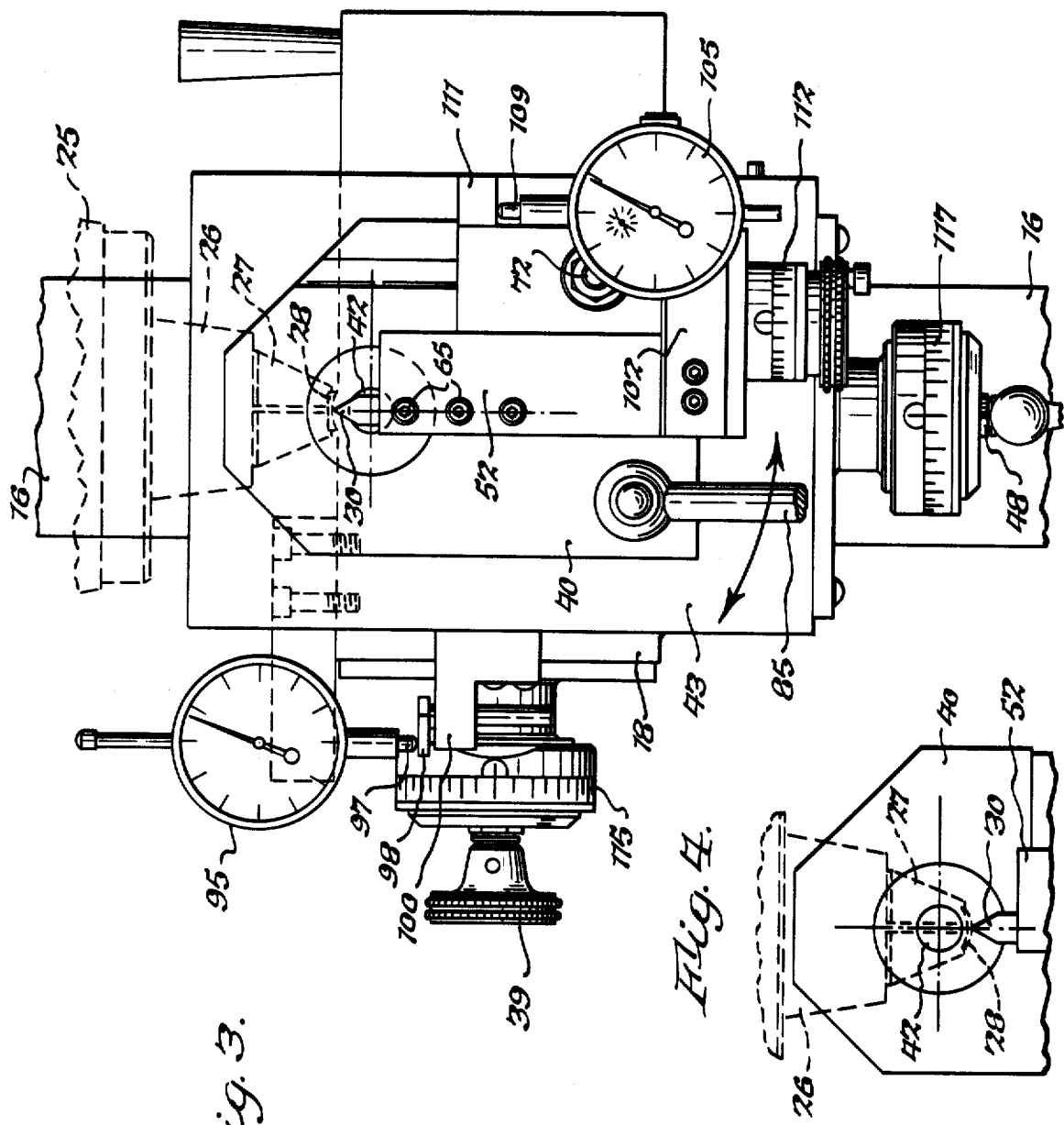

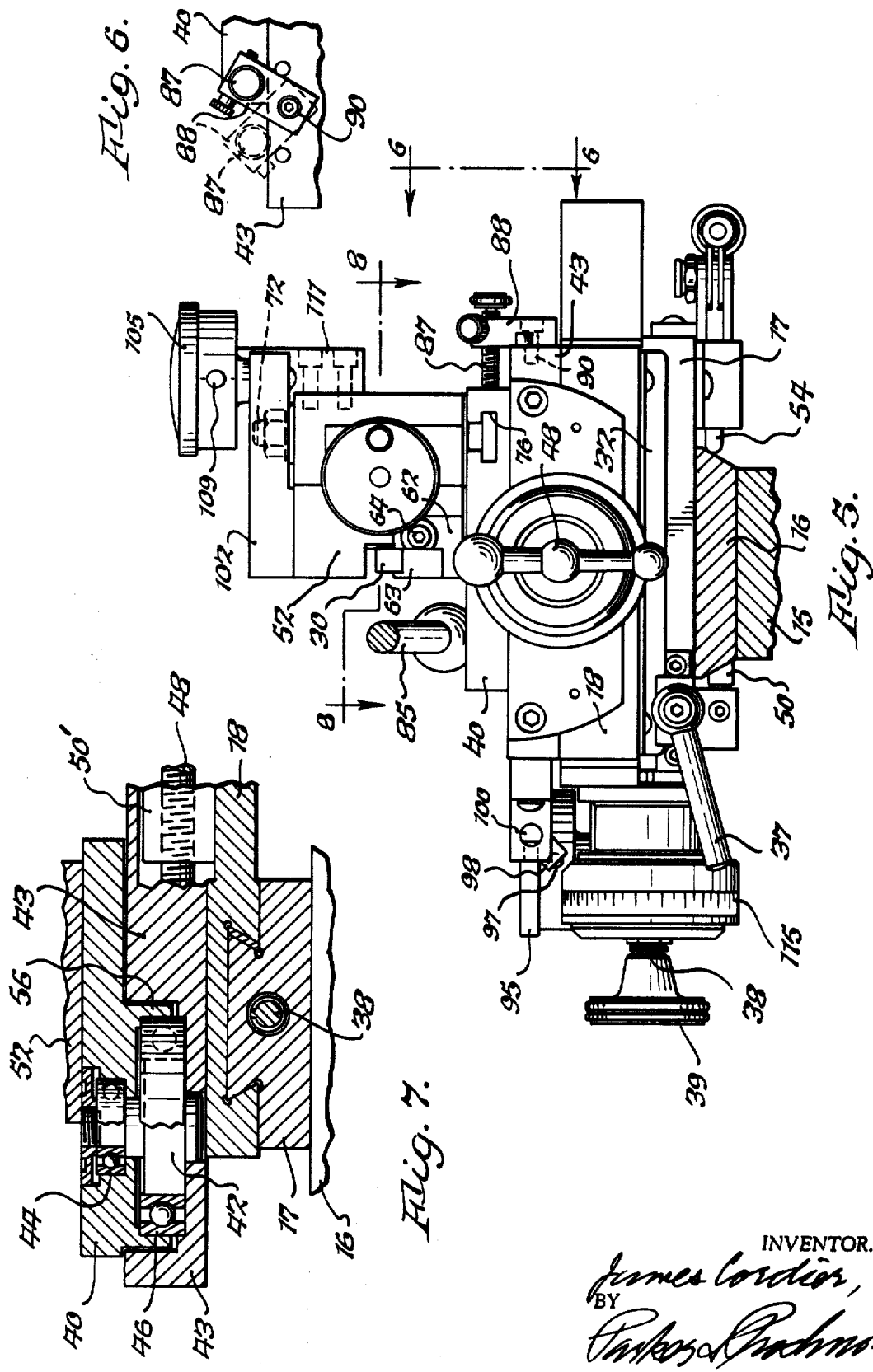

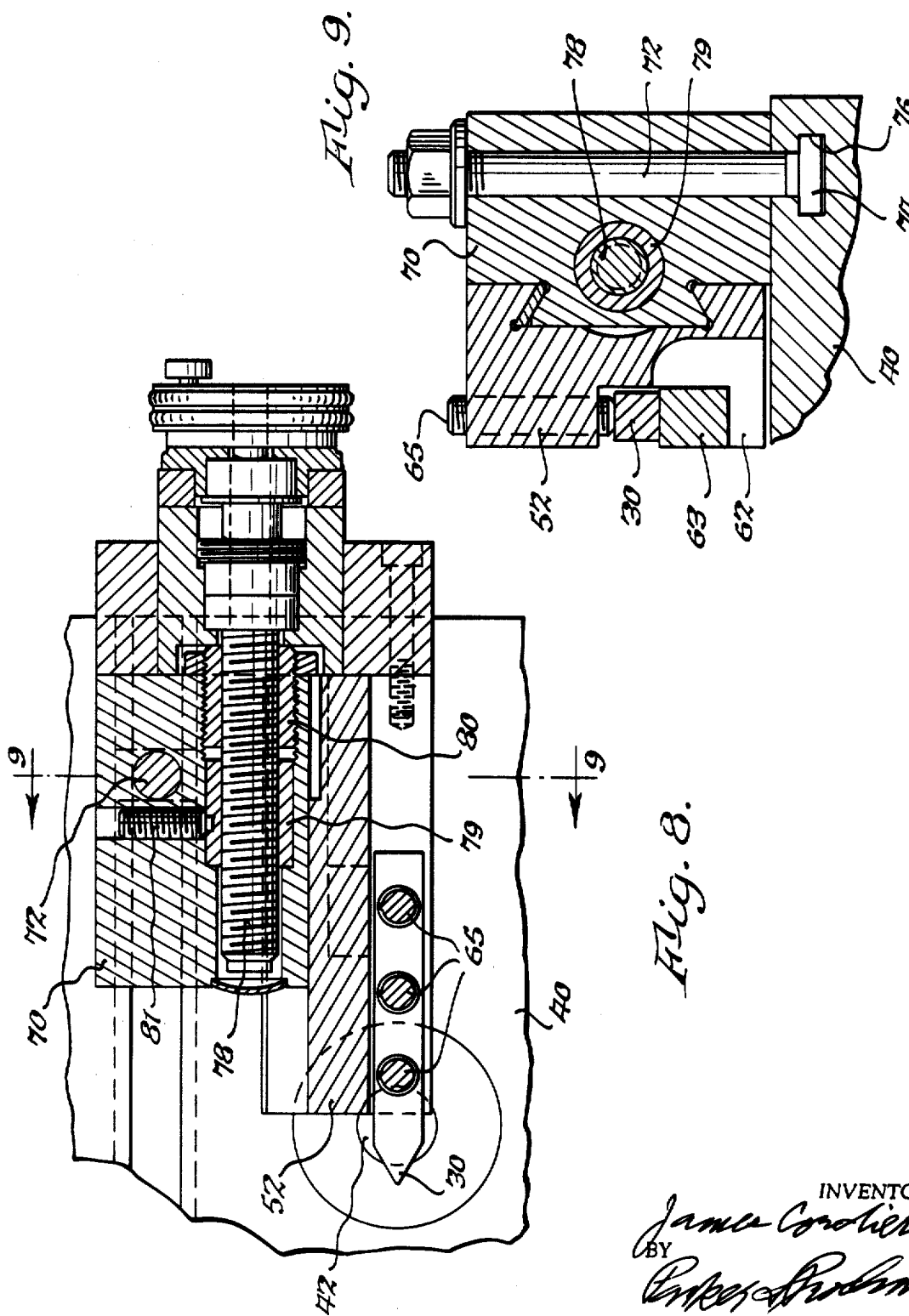

RADIUS-TURNING ATTACHMENT FOR LATHES

One of the objects of the invention is to provide an improved construction for producing highly accurate radius-turning of the work with easy adjustment for turning work of different sizes.

Another object is to provide improved means for securely locking the cross-slide of the lathe against movement.

Another object is to provide a center stop which is movable into and out of engagement with the swivel member of the attachment.

An example of precision work of the kind contemplated for use of the present machine would be in the art of the manufacture of contact lenses wherein the concave surface must be turned to a precise radius while the convex surface must be turned to still another radius.

In the accompanying drawings this example has been set forth purely as an illustration for the use of the machine, and, FIG. 1 is a side elevation of a radius-turning lathe embodying this invention.

FIG. 2 is a perspective view of a gage for use in connection with the locking of the cutting tool on the attachment.

FIG. 3 is a top plan view thereof, set for concave surfaces.

FIG. 4 is a fragmentary view of the holding means for the workpiece and the cutting tool, set for convex surfaces.

FIG. 5 is an end view of the attachment.

FIG. 6 is a detail view as seen from the line 6–6, FIG. 5.

FIG 7 is a fragmentary sectional view showing the mounting of the swivel member on which the toolholder is arranged.

FIG. 8 is a fragmentary, horizontal sectional view on an enlarged scale on line 8–8, FIG. 5.

FIG. 9 is a transverse sectional view on line 9–9, FIG. 8.

The attachment incorporating this invention may be applied to a lathe of any suitable construction, and as illustrated in the drawings, it is mounted on a lathe similar to the one shown in the Strom U.S. Pat., No. 2,897,578 of Aug. 4, 1959, in which the lathe comprises a bed 15 provided on the upper portion thereof with a bedplate 16 of hardened material and having a flat top and inwardly converging, longitudinal edge portions. 17 represents a base for the bottom or movable slide 18 of the slide rest, this base being adjustable lengthwise of the lathe bedplate 16 and releasably secured thereto by any suitable means, for example, the bolts 50 and 54, and the means for actuating them is that shown in the Strom U.S. Pat., No. 2,897,578.

In FIGS. 3 and 4, 25 represents the headstock of a lathe with which the herein described attachment is intended to cooperate, and 26 represents the spindle of the lathe which has a collet 27 mounted thereon which supports the workpiece 28 which in the construction illustrated is a part to be finished into a contact lens. This collet has a shallow recess of a diameter which fits the outside diameter of the lens. Collets of this construction may be used for holding the work. In FIG. 4 the workpiece is inverted so that the outer or convex portion thereof can be machined by means of the cutting tool 30 of this attachment.

When the herein disclosed attachment is used in connection with the manufacture of contact lenses it is very important that the inner slide 18 is accurately positioned and maintained in such position, and for this purpose there is provided a locking means including a strip 32 of metal or other rigid material rigidly secured on the movable slide 18 and extending crosswise of the lathe bed. The movable slide 18 may be held in correct relation to the base 17 by means of a locking construction including a pair of clamping blocks 33 and 34 connected by a clamping screw 35 having a threaded engagement with the fixed block 33 secured to the base 17 and a sliding connection with the block 34. This screw may be turned by means of a locking lever 37. The strip 32 being secured to the slide 18 moves with it while the block 33 is secured and stationary with the base 17. When the movable slide is correctly positioned, it may be securely locked in such position by moving the block 34 into position to clamp the strip 32 between the blocks 33 and 34. The lower cross-slide 18 may be moved into position to be locked in any suitable manner, for example, by means of an adjusting screw 38 operable by means of a handle or knob 39. The strip 32 is made quite long since the mechanism might be used for other types of radius work besides contact lenses.

40 represents a swivel member on which the tool is mounted. If this attachment is used for forming contact lenses the centerline about which the tool swings is placed laterally on the central line of the lathe spindle and is in immediate proximity thereto. The swivel member 40 is mounted on a swivel post or shaft 42, FIG. 7, which is fixedly mounted on an upper slide member 43 and is connected by two ball bearings 44 and 46 to the swivel member 40. These bearings are preloaded against each other to eliminate all play and form a rigid yet free-turning swivel member. This is a tremendous benefit when machining contact lenses as a smooth finish is produced free of the usual machining lines. As these lines have to be lapped out after machining, the smaller these lines can be, the less lapping is required with reduced chance of destroying the geometry of the lens.

The movement of the upper slide member 43 for correctly positioning the same is controlled by a screw 48 which controls movement of the swivel member 40 along the axis of the spindle and will determine the position of the center of the radius produced along the axis of the work. This slide member 43 has to be exactly parallel to the axis of the spindle so that when changing the center of the radius along the work, the center of the swivel member does not move off the center of the spindle.

In the construction shown in FIG. 7 the movement of the slide member 43 may be controlled by a feed screw 48 which has a threaded engagement with a nut 50' mounted on the lower slide member 18, and this screw through the swivel post controls the movement of the swivel member 40 on which the toolholder 52 is mounted toward and from the work.

As clearly shown in FIG. 7, the upper slide member 43 is pivotally connected with the swivel member 40 by means of a downwardly extending annular flange 56 which extends into a hole or recess formed in the upper slide member 43. The annular flange 56 extends about the lower bearing 46 which is also recessed in the upper slide member 43. Initially of course, the upper slide member is moved by means of the feed screw 48 to enter into the work along the axis of the spindle of the lathe to the desired extent, after which the tool is swung about a center.

The curvature to be cut into the workpiece is controlled by the adjusting of the tool ahead of or behind the axis of the swivel post 42. In the construction shown for this purpose the tool 30 is mounted on a toolholder and is suitably clamped in fixed position to the tool holder by any suitable means, such for example as a pair of wedge members 62 and 63 adjustable relatively to each other by means of a screw 64. The series of clamping screws 65 extending through the part 52 of the tool holder, when correctly set, puts the point of the tool at an elevation intersecting the turning center of the spindle 26.

The toolholder is made in two parts adjustable relatively to each other in such a manner as to move the tool relatively to the swivel post 42 to determine the radius on which the tool moves when cutting a face of the work. The tool holder 52 moves when cutting a face of the work. The toolholder 52 has a dovetailed slide connection with a part 70 of the toolholder. The part 70 of the toolholder is mounted on the swivel member 40 in any suitable manner, for example, by means of a bolt 72 having a square head 74 arranged in a T-shaped slot 76 recessed in the upper face of the swivel member. This bolt which extends through the part 70 of the toolholder, is adjustable in the T-slot 76 to produce a rough adjustment of the toolholder relatively to the axis of the swivel post 42. For a finer adjustment the toolholder 52 and part 70 of the toolholder may be adjusted relatively to each other on the dovetailed slide by means of an adjusting screw 78 extending through a pair of nuts 79 and 80 arranged in the part 70 of the toolholder to provide an accurate adjustment of the screw 78 without play in a well-known manner. A setscrew 81 extending through the part 70 of the toolholder and engaging the nut 79 serves to secure this nut against rotation when the other nut 80 is tightened to prevent lost motion or play of the screw 78.

By adjusting the two parts of the toolholder relatively to each other it will be obvious that the tool itself will be moved toward and from the axis of the swivel post 42 so that the radius of the curvature along which the cut is made may be set as desired. This screw may be employed also for adjusting the point of the tool relatively to the gage 58.

The swivel member 40 may be swung about the axis of the swivel post 42 in any suitable manner, for example, by means of a handle or arm 85 having a lower end thereof adjustably secured on the swivel member 40 to best suit the convenience of the operator of the lathe. The movement of the swivel member is limited by means of a stop screw 87 positioned to have the end thereof engage the swivel member when the same is in its "at center" position. The screw has a threaded engagement with an an arm pivoted at 90 on the slide member 43. When the arm is in the position shown in FIG. 6, the stop member or screw 87 will engage the swivel member 40 when the same is swung to the right in FIg. 5. When it is desired to move the swivel member past the center position, the arm 88 is moved into the position shown in broken lines in FIG. 6 so that the screw will not interfere with the moving of the swivel member to the right of the axis of the lathe spindle.

Dial gages are provided for indicating the extent of the movement of the tool in the direction parallel to the axis of the lathe, and to indicate the distance of the tool from the swivel post 42. These gages may be of any suitable or desired character and a gage 95 is suitably mounted on a fixed part of the device and has a movable member 97 arranged to contact with a projection 98 extending downwardly from a bracket 100 mounted on the slide member 43. The gage may be set so as to engage the projection 98 when the same is in one end of its movement spaced from the work, and the gage will then read the extent of movement from this slide member into the work.

The other gage 105 is arranged to cooperate with a part of the toolholder 52 and may be mounted on an extension or post 102 secured on the slide member 43. This gage has a movable part 109 which may be positioned into contact with a projection 111 on the toolholder in fixed relation to the point of the tool 30. This gage consequently will indicate the extent of movement of the tool ahead of or behind the center of rotation or swing of the swivel post 42.

In addition to the gages, graduations 115 may also be provided on a disc which rotates with the handle 39 which actuates the cross-slide screw 38, and similar graduations 113 and 117 may also be provided by means of discs secured to the shafts which effect adjustment of the screw 78 and screw 48. These graduations enable an operator to determine approximately the positions of the tool but for greater accuracy the gages 95 and 105 would be consulted.

OPERATION

It is necessary in setting up the lathe for any specific lens radius, either for convex or concave turning, to accurately and precisely start out from a zero position. This zero position means that the tip of the cutting tool intersects the turning center of the spindle and the center of swing of the swivel that the tool is mounted on.

As previous described, the cutting tool 30 may be adjusted vertically in its holder to intersect the center line of turning of the lathe spindle 26. After thus fixing the cutting tool 30 the knob 39 of screw 38 would be used to move the cross-slide 18 to bring the cutting tool tip into intersection with the center of rotation of the spindle 26. The clamp blocks 33 and 34 would then be locked onto the strip 32, thus locking the cross-slide 18 to the bedplate 16.

It has been assumed that the base 17 of the cross-slide 18 has previously been slid on the bedplate 16 to a position which brought the cutting tool 30 into a working position where the cutting tool is within range of being adjusted to do the cutting required. The locking arrangement shown in the Strom U.S. Pat. No. 2,897,578 would have been set so that the bolts 50 and 54 lock the base 17 onto the bedplate 16. The gage block 58 would now be brought into use to allow the cutting tool tip 30 to be adjusted exactly on the center of the swivel. This is accomplished by adjustment of the toolholder 52 by use of the screw 78 and then a reading would be taken of the position of the graduations 112 on the knob. The dial gage 105 would also at that time be set to read zero.

We now have the tip of the cutting tool set in zero position and can now proceed to set the tool to make either a concave or convex cut on the workpiece. If a concave cut is desired, as shown in FIG. 3, the screw 78 is adjusted coarsely to a reading on the graduations 112 until such a radius dimension required is read. This would be moving the cutting tool 30 ahead of the swivel center toward the spindle and workpiece by means of the screw 48. A more precise reading is taken on the gage 105. After final setting the tool 30 is then moved toward the workpiece. After touching the face of the workpiece, a reading may be taken on the graduation 117 and the gage 95 for determining the depths of the cuts to be taken. All of the cuts are taken by adjustment of the screw 48 and its slide 43 without disturbing the adjacent radius setting. The handle 85 is moved to swing the tool about its set radius while the stop screw 87 will prevent its going past the centerline of turning.

To turn a convex cut the just mentioned setting up is repeated but adjustment is made behind the zero center of the swivel away from the workpiece and spindle, as illustrated in FIG. 4.

The combined extra heavy preloaded swivel post 42 with the "double in line with the spindle centerline" slides 43 and 52, the one 43 for cut feed and the other 52 for radius swing of the cutting tool, both being independent of the other, make for highest precision machining with great convenience and versatility. The flexibility of the in or out stops 87 and 98 with the long travel indicator gages 95 and 105 make for ease of repeating positions over relatively long distances.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A radius-turning lathe including:
   a. a rotary spindle,
   b. A bed extending parallel to the axis of said spindle,
   c. a lower cross-slide adjustable relatively to said bed for setting said tool on the center of said spindle,
   d. an upper slide mounted on said cross-slide and movable toward and from the work,
   e. a bearing shaft fixedly mounted on said upper slide,
   f. upper and lower bearing assemblies mounted on said bearing shaft and spaced from each other,
   g. a swivel member mounted on said upper and lower bearing assemblies,
   h. a cutting tool mounted on said swivel
   i. said swivel member and said upper slide having cooperating recesses for receiving said lower bearing assembly,
   j. said upper and lower bearing assemblies being preloaded against each other.

2. A radius-turning lathe as in claim 1 and including:
   a. an adjustable mounting on said swivel member slide for positioning said tool to swing on a radius relatively to said spindle whereby said upper slide may be moved toward and from the work without changing the adjustment of the radius set by said mounting.

3. A radius-turning lathe as in claim 1 and including:
   a. a strip of rigid material secured on said lower cross-slide, and b. clamping means mounted in fixed relation to the bed of the lathe and movable into position to grip said strip for securing said lower cross-slide in fixed relation to said bed.

4. A radius-turning lathe as in claim 1 and including:
 a. means for moving said swivel member and said upper slide independently of each other, and
 b. a gage mounted on said adjustable mounting and contacting said swivel member to record the extend of movement of said tool.

5. A radius-turning lathe as in claim 1 and including:
 a. a gage mounted on said lower cross-slide and having a part movable into contact with said upper slide to indicate the extent of movement of said upper slide.

6. A radius-turning lathe as in claim 1 and including:
 a. a stop on said slide for engaging said swivel member to limit return movement of the same to a starting position.

7. A radius-turning lathe as in claim 6 and including:
 a. a pivot on which said stop member is mounted for movement into and out of position to limit movement of said swivel member.